Patented June 8, 1943

2,321,056

UNITED STATES PATENT OFFICE 2,321,056

PROCESS AND REAGENT FOR RESOLVING EMULSIONS

Truman B. Wayne, Houston, Tex.

No Drawing. Application July 29, 1938,
Serial No. 222,061

16 Claims. (Cl. 252—337)

This invention relates to a process of resolving petroleum emulsions of the character commonly encountered in the production, handling and refining of petroleum.

The principal object of this invention is to provide an improved process and reagents for treating petroleum emulsions to separate them into their component parts of oil and water.

Another object is to provide a novel product or reagent which is water-wettable, interfacial and surface-active in order to enable its employment as a demulsifier or for such uses where water-wettable properties and characteristics are necessary or desirable.

Further objects will appear from the following in which the reagents and the process for their employment will be described as related to their employment for the treating of petroleum emulsions.

The present process comprises subjecting a petroleum emulsion of the water and oil type to the action of small proportions of a complex organic condensation product of high molecular weight, resembling somewhat the synthetic resins produced by the condensation of two or more organic bodies containing resinophore groups but differing from the conventional synthetic resins or modified synthetic resins in that they have been rendered suitable for petroleum dehydration through structural modification which imparts to them the characteristics or properties necessary for this purpose.

My prior Patents Numbers 1,912,330, Re. 20,717 and 1,937,259 have all disclosed the broad idea of preparing petroleum demulsifiers from substances ordinarily used in the production of the hard, insoluble, infusible synthetic resins of commerce. It was disclosed in these patents that if reactions between these chemical bodies are allowed to proceed under certain conditions that modified resins are obtainable which, though resembling the insoluble, water-repellent resins used in the plastics and paint industries, possess the additional property of being water-wettable. It was further shown that some of the modified resin demulsifiers so produced are water soluble or oil soluble, and that some of them may be both water and oil soluble to the extent necessary for petroleum demulsification. If water wettable and water soluble to the slight extent necessary to form colloidally hydrated solutions, the demulsifying properties seem to reach a maximum under the conditions met in actual field application of the treating process.

The present invention is an extension and improvement on the general class of demulsifying process disclosed in my prior Patent Re. No. 20,717 which disclosed the use of a broad class of substances derived from "a phenolic body and one or more aliphatic bodies containing resinophore groups, together with a modifying agent capable of preventing the production of a reaction product of the hard, insoluble, synthetic resin type." The term "phenolic body" was broadly used to include the usual phenolic substances such as the monohydroxy and polyhydroxy phenols, and their homologs; phenol carboxy acids such as hydroxy benzoic acids, hydroxy phthalic acid, and also other resin-forming acidic aromatic bodies such as phthalic acid or its anhydride which are capable of reacting with resinophore aliphatic bodies to form resins of the synthetic type. The latter substances are not strictly phenols, but are strict equivalents of the latter in that they are resin-forming, aromatic bodies whose acidic properties render them capable of undergoing reactions whose products are characterized by the presence of one or more phenyl, phenylene, naphthyl, or similar groups or residues in intimate association with the corresponding aliphatic residues resulting from condensation and polymerization. The term "phenoloid" was used in the above mentioned patent to cover such phenol-like substances in reference to their resin-forming properties.

I have discovered that phthalic anhydride sulfonic acids, preferably phthalic anhydride 4-sulfonic acid, differs quite markedly from phthalic acid or phthalic anhydride in its reactions with hydroxy, amino, or hydroxy-amino bodies, and that the product prepared from is differs considerably from products prepared from the unsulfonated phthalic anhydride by procedures quite analogous to those used herein but, of course, differing because of the differences in structure of the starting materials. For instance, the reaction of an hydroxylated fatty body such as ricinoleic acid, hydroxy-stearic acid, castor oil, blown oils, or fractional esters of a non-hydroxy fatty acid and a glycol, glycerol, or hydroxyamine, with phthalic anhydride may for practical purposes be considered as endothermic; that is, considerable heating must be done to promote the chemical combinations. However, when conducting an analogous reaction using phthalic anhydride 4-sulfonic acid, the temperature must be controlled to prevent a violent exothermic reaction wherein considerable heat is evolved. Phthalic anhydride may be melted at 128–130° C.

and poured into castor oil at 20° C. without generation of heat or appreciable combination. The melted phthalic anhydride merely chills and solidifies as it strikes the cold castor oil. However, if phthalic anhydride 4-sulfonic acid is warmed to 90–100° C. to make it pour freely, and is then added to castor oil at 20° C., a violent reaction ensues which is accompanied by foaming and decomposition. Sulfur dioxide fumes are evident, and when the reaction subsides, the mass is very tary, viscous, and resinous.

Another important distinction is that under proper conditions which will hereinafter be described, modified resinous bodies of the "glyptal" type may be prepared which, though distinctly resinous in character because of extensive esterification and polymerization, are distinctly hydrophilic in character due possibly to the presence of one sulfonic group, or residue from one sulfonic group for each dicarboxy acid residue present in the condensation product. When the product is prepared from unsulfonated phthalic anhydride, and is then subsequently sulfonated, it is doubtful whether the sulfonic groups attach themselves to the dicarboxy acid residues because of the great difficulty ordinarily encountered when attempting to sulfonate phthalic anhydride in the uncombined state. It is most likely the sulfonic groups or even sulfate groups, $OSO_3H$, attach themselves to the fatty acid residue instead. Furthermore, there usually is considerable hydrolysis of the organically combined sulfur, as well as decomposition of the ester linkages of the resin when attempting to free it from the excess of inorganic acid by conventional neutralization and/or washing procedures.

Another possible explanation for the differences exhibited by the phthalic anhydride sulfonic acids is that three resinophore groups are provided per molecule instead of two. The sulfonic acid group can esterify hydroxyl groups or combine by neutralization or acylation with amino groups, and thus provides another linkage for resin formation and/or polymerization.

In order to illustrate specifically the new type of condensation product contemplated for use in accordance with the present invention, I have set forth below several examples of the type of product suitable for use. However, it is to be understood that I do not confine myself to the specific chemicals, or proportions thereof, set forth in these examples, as it will be readily apparent that equivalents of these specific chemicals and their various derivatives, or other proportions may be employed without departing from the spirit of the invention or the scope of the appended claims.

The sulfo-phthalic anhydride used in the following examples is believed to be the 4-sulfonic acid, and is 96% pure. The remainder is unsulfonated phthalic anhydride and free sulfuric acid.

Example I 936 parts of castor oil are placed in a water-cooled reaction flask fitted with motor-operated stirrer, and reflux condenser attached to a graduated volumetric receiver. To the cold castor oil is added 228 parts of phthalic anhydride 4-sulfonic acid, previously heated to 90° C. to facilitate gradually adding it to the castor oil. A reaction ensues which raises the temperature considerably. The mass is then raised to a temperature of 135° C. to render the mass homogeneous after 4 hours. Since no water of esterification is formed by this procedure, the structure of the product is evidently as follows:

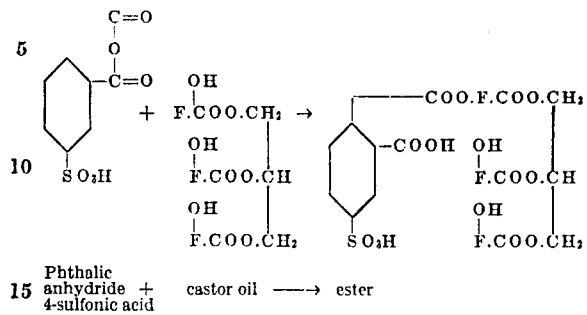

Phthalic anhydride + 4-sulfonic acid + castor oil → ester

The residual carboxyl group may be neutralized with ammonia or other suitable base, or may be converted to an amine salt, amide, or ester.

This condensation product contains a free carboxyl, a free sulfonic, and a free hydroxyl group, all of which impart polar properties to the molecule which cause it to be wetted by water and to undergo some degree of dispersion in water. It is therefore suitable for the resolving of petroleum emulsions.

Example II

The product described in Example I is heated at temperatures ranging between 150° C. and 230° C. to esterify two or even three of the hydroxyl groups of the castor oil. The complete ester is cyclic in structure, as indicated by the following formula:

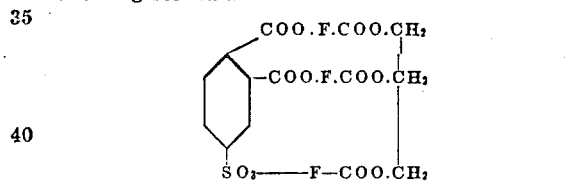

Although highly resinous in character, the product possesses considerable hydrophilic properties because of the sulfonic acid residue.

Example III 936 parts of castor oil, in solution in 450 parts of solvent naphtha or sulfur dioxide extract, is converted to the diethanolamine derivative by heating at 90–110° C. with 315 parts of technical diethanolamine. The derivative is then cooled to 20–30° C. and 684 parts of melted phthalic anhydride 4-sulfonic acid is added. The mass is heated at 125–135° C. for four hours. Complete esterification does not occur at this temperature, but an addition product is formed by the anhydride radical and one of the hydroxyls present on the fatty amine derivative. Whether combination occurs at the hydroxyl on the fatty chain, or at the alkylolamine radical, is not known.

The product is preferably esterified by refluxing with an excess of anhydrous isopropyl or primary butyl alcohol, but may be neutralized with ammonia or other suitable base.

Example IV

The product described in Example III may be further condensed and polymerized by heating at temperatures ranging between 150° and 250° centigrade. The degree of condensation can be followed by noting the yield of water of esterification derived from condensation between the hydroxyl or amino groups on one hand, and the acidic groups on the other.

Example V

The reacting chemicals and proportions may be the same as shown in the preceding Examples III or IV, but the procedure is varied by first forming the fatty amide of the alkylolamine and then subsequently condensing the amide (instead of the fatty amine soap) with the sulfo-phthalic anhydride.

Example VI

A non-hydroxy fatty acid such as oleic acid is condensed with a molecular equivalent of a glycol, glycerol, or an alkylolamine to form a hydroxylated fractional ester, or fatty amine soap or amide. This product is then condensed with the sulfo-phthalic anhydride.

For example, 855 parts of oleic acid are esterified with 318 parts of diethylene glycol by heating with 10 parts of 98% sulfuric acid at 175–220° C. until 54 parts of water of esterification have been recovered. To the three molecular equivalents of mono-oleyl ester of diethylene glycol are added 228 parts (one molecular equivalent) of phthalic anhydride 4-sulfonic acid and the mixture is heated until 36 parts of water are recovered. The structure of this product may be illustrated as follows:

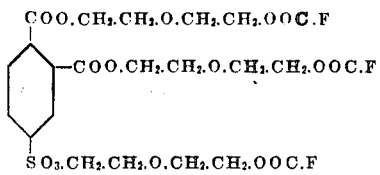

wherein F is the fatty chain. The analogy between the above structure and that shown in Example II is readily seen. In this case, three mols of mono-oleyl ester of diethylene glycol are used to provide the three hydroxyls present on one mol of triricinolein (castor oil).

Example VII

A similar product can be prepared from three mols of oleic acid, one mol of triethanolamine, and one mol of phthalic anhydride 4-sulfonic acid, 855 parts of oleic acid and 140 parts of triethanolamine in 450 parts of solvent naphtha are warmed at 80–100° C. to form the triethanolamine soap with one molecular equivalent of the oleic acid. 10 parts of 98% $H_2SO_4$ are then added as a catalyst and the mass is heated at 190–220° C. in a vessel provided with a reflux condenser and moisture trap until 36 parts of water have been collected. The resulting oleic acid soap of triethanolamine, now having two of its hydroxyl groups esterified with oleic acid residues, is then heated at 135–150° C. for 4 hours with 228 parts of phthalic anhydride 4-sulfonic acid. The resulting product, which has one free carboxyl and a free sulfonic group, may be esterified with one or even two more equivalents of the above described alkylolamine soap-ester, or may be esterified with a monohydric or polyhydric alcohol, or converted to an amine soap or amide.

Example VIII

The use of sulfo-phthalic anhydride instead of the unsulfonated product allows the production of modified "alkyd" resins which are water-wettable when prepared under conditions analogous to the preparation of the water insoluble, water repellent "alkyd" resins of commerce wherein phthalic anhydride is reacted with a polyhydric body. This property is believed to be due to the strongly negative polar sulfo groups or their residues present in the molecule in the proportion of one sulfo group or residue to each polycarboxy acid residue.

As a specific example, 444 parts of phthalic anhydride 4-sulfonic acid are reacted with 276 parts of glycerol at 150–200° C. Condensation and polymerization occur rapidly with the production of a resinous alkyd resin containing modifying sulfo groups. The material may be dissolved in an appropriate solvent and used as such in the resolution of petroleum emulsions, or may be converted into a salt, ester, or amino derivative, preferably an N-alkylated sulfonamide.

Example IX

A sulfo alkyd resin prepared as in Example VIII is esterified by heating with one or more molecular equivalents of a long chain fatty alcohol, preferably having five or more carbon atoms in the alkyl chain. An ester is formed by interaction of the alcohol with a sulfo group of the sulfo-modified "alkyd" resin. Suitable alcohols are amyl, hexyl, octyl, lauryl, and oleyl alcohols.

Example X

A product prepared as disclosed in Example VIII is condensed through esterification with a polyhydroxy body such as castor oil, or a plurality of monohydroxy bodies such as ricinoleic acid. This product differs from those disclosed in Examples I to VII in that the phthalic anhydride 4-sulfonic acid is first condensed with a polyhydric alcohol to form a sulfo-modified alkyd resin which is then further modified by esterification of one or more of its sulfo-groups with a hydroxylated fatty body.

Example XI

A product prepared as disclosed in Example VIII is converted to a mixed fatty sulfonamide derivative by reacting it with a molar equivalent of an N-alkylated fatty amide of a primary amine. For example, 300 parts of the sulfo "alkyd" resin prepared as described in Example VIII is heated at 150°–220° C. with one mol of the mono-ricinoleyl amide of monoamylamine to form the corresponding mixed N-alkylated fatty-sulfonamide of the sulfo "alkyd" resin.

While phthalic anhydride 4-sulfonic acid has been used in all of the above examples, doubtless other sulfonic acids of polycarboxy acids or their corresponding anhydrides may be used. However, phthalic anhydride 4-sulfonic acid or its isomers are preferred for reasons of availability and cost, and there would be no appreciable advantage to using other polycarboxy sulfonic acids. Sulfo-succinic acid, for instance, might be made commercially available by sulfonation of maleic acid, but would possess no advantages over sulfophthalic anhydride.

Various fatty acids including oleic, ricinoleic, linoleic, linolenic and modified fatty acids such as the various sulfuric acid modified fatty bodies now well known in the art of breaking emulsions, other types of modified fatty bodies formed by oxidation, hydroxylation, and partial decomposition by blowing with air, treating with oxidizing agents, halogens followed by hydroylsis, or dry distillation in vacuo, etc., are suitable for my purpose.

Among suitable amines are the various primary, secondary, and tertiary alkylolamines such as monoethanolamine, diethanolamine, triethanolamine, and the corresponding amines higher in the homologous series. One may also employ the various non-hydroxy alkylamines, aralkylamines, alicyclic and hydroaromatic amines when the hydroxylation of the molecule has been otherwise provided; for instance, through the use of hydroxy-acids or even a polyhydroxy amino body. Moreover, hydroxylation of these amines is readily accomplished by reacting them with suitable glycol or glycerol chlorohydrins, alkylene oxides, etc.

Various examples of the many products which answer the descriptions herein made are contemplated. Some may be oil soluble, others water soluble. In many instances they may possess dual solubility to an appreciable extent. Even apparent insolubility is of no consequence, as the products are all soluble at least to the extent necessary for segregation at the emulsion interface as a water-wettable colloid. The suitability of any of these products to the breaking and resolving of any given emulsion can readily be determined by the conventional procedures now in general use in oil fields and in laboratories which make such determinations.

Where reference is made to "sulfo" groups, it is understood that these include $OSO_3H$ and $SO_3H$ groups, and their neutralization products.

Where reference is made to "fatty acids," it is understood to include aliphatic acids having eight or more carbon atoms in their hydrocarbon chain. As will be understood by those skilled in the art, rosin and resin acids, naphthenic acids, and the like, are obvious equivalents for the fatty acids described in the present application. The term detergent-forming refers to these acids and also sulfonic acids derived from various aliphatic, alicyclic, hydroaromatic and aromatic bodies found in, or derived from, coal tar, asphalt, petroleum, etc.

Where reference is made to polycarboxy acids in the appended claims, it is understood that this term is meant to also include the corresponding anhydrides, as will be noted by reference to the examples hereinbefore given.

The term "water-wettable" as used in the specification and claims refers to the characteristic of the product which enables it to be readily wetted by water and which is usually accompanied by some degree of hydration of the product in contact with the aqueous phase of the emulsion. When the product segregates at the interface of the emulsion and is adsorbed at the interfacial film where the hydrophobe body responsible for the emulsion exists, the water-wettable property of this product counteracts the effect of the hydrophobe present in the emulsion and thus effects its resolution.

The term "water-soluble" is used to include the property of forming colloidally hydrated aqueous solution. From the following paragraph it will be seen that only a limited degree of actual "water solubility" is necessary for the reagents used for breaking petroleum emulsions, for the reason that extremely small proportions of the reagents are ordinarily used.

The term "non-nitrogenous polyhydric alcohol" is used in the claims to distinguish from amino alcohols such as the alkylolamines.

The term "oil soluble" is used to include the property of colloidal dispersion in the oil phase.

The improved treating agents prepared in accordance with the present invention are used in a small percentage, viz., in the proportion of one part of treating agent to form 2,000 to 20,000 parts (or, in some cases, as high as 30,000 parts) of petroleum emulsion, either by adding the concentrated product directly to the emulsion of after diluting with water or oil in the conventional manner. The treating agents may be used in any of the numerous ways commonly employed in the treatment of petroleum emulsions as will be apparent.

I claim:

1. A petroleum demulsifying composition which comprises as a component a water-wettable, interfacial and surface active modified alkyd resin condensation product characterized by the presence of at least one sulfo group in the molecule attached directly to at least one aromatic polycarboxy acid residue, and in the proportion of one sulfo group for each sulfonated aromatic polycarboxy acid residue and further characterized by the presence of at least one residue from a higher aliphatic body selected from the group consisting of hydroxylated fatty bodies, hydroxylated fatty amino bodies and non-nitrogenous polyhydric alcohols.

2. A petroleum demulsifying composition which comprises as a component a modified alkyd resin condensation product characterized by the presence of at least one sulfo-phthalyl residue in each molecule and further characterized by the presence of at least one residue from a modifying body consisting of a detergent-forming compound.

3. A petroleum demulsifying composition which comprises as a component a water-wettable, interfacial and surface active modified alkyd resin condensation product characterized by the presence of at least one aromatic poly-carboxy acid residue containing a sulfo group, at least one residue from a polyhydric body, together with at least one modifying residue from a fatty body.

4. A petroleum demulsifying composition which comprises as a component a water-wettable, interfacial and surface active modified alkyd resin condensation product of the general type $(T.SO_2X)_n$—$A_n$—$F_n$, wherein T is an aromatic polycarboxy acid residue; $SO_2X$ is selected from the group consisting of a sulfo group, a sulfo-ester, and a sulfonamide group attached directly to the aromatic polycarboxy acid residue T; A is a residue from a hydroxylated aliphatic body; F is a residue derived from a fatty body; and $n$ is at least one.

5. A petroleum demulsifying composition which comprises as a component the water-wettable, interfacial and surface active reaction product of sulfo-phthalic anhydride and castor oil.

6. A petroleum demulsifying composition which comprises as a component the water-wettable, interfacial and surface active reaction product of a hydroxy-alkyl amine, a higher fatty acid containing at least eight carbon atoms, and sulfo-phthalic anhydride.

7. A petroleum demulsifying composition which comprises as a component the water-wettable, interfacial and surface active reaction product of a hydroxylated higher fatty compound and sulfo-phthalic anhydride.

8. A petroleum demulsifying composition which comprises as a component the water-wettable, interfacial and surface active reaction product of sulfo-phthalic anhydride and a hydroxylated body derived from a higher fatty acid, and further characterized by at least one of the acidic groups of the sulfo-phthalic anhydride residue being esterified by hydroxyl groups attached to the same hydroxylated body.

9. A petroleum demulsifying composition which comprises as a component the water-wettable, interfacial and surface active reaction product of sulfo-phthalic anhydride and at least two mols of a hydroxylated body derived from a higher fatty acid, and further characterized by the fact that one residue from a hydroxylated body is present for each carboxyl group of the polycarboxy acid residue.

10. A petroleum demulsifying composition which comprises as a component the water-wettable, interfacial and surface active reaction product of sulfo-phthalic anhydride and a hydroxylated higher fatty-amino body.

11. The process of treating petroleum, comprising, treating petroleum with a small percentage of a petroleum demulsifying composition having as a component a water-wettable, interfacial and surface active modified alkyd resin condensation product characterized by the presence of at least one sulfo group in the molecule attached directly to at least one aromatic polycarboxy acid residue, and in the proportion of one sulfo group for each sulfonated aromatic polycarboxy acid residue.

12. In the process of treating petroleum, comprising, treating petroleum with a small percentage of a petroleum demulsifying composition having as a component a water-wettable, interfacial and surface active modified alkyd resin condensation product of the general type

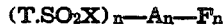

wherein T is an aromatic polycarboxy acid residue; $SO_2X$ is selected from the group consisting of a sulfo group, a sulfo-ester, and a sulfonamide group attached directly to the aromatic polycarboxy acid residue T; A is a residue from a hydroxylated aliphatic body; F is a residue derived from a fatty body; and $n$ is at least one.

13. A process of making modified alkyd resin condensation products comprising reacting a sulfonated aromatic polycarboxy acid residue with a non-nitrogenous polyhydric alcohol.

14. A process of making water-wettable, interfacial and surface active modified alkyd resin condensation products comprising reacting a sulfonated phthalic acid residue with a polyhydric body in the presence of a modifying body consisting of a detergent-forming compound.

15. A water-wettable, interfacial and surface-active modified alkyd resin condensation product characterized by the presence of at least one sulfo group in the molecule attached directly to at least one aromatic polycarboxy acid residue, and in the proportion of one sulfo group for each sulfonated aromatic polycarboxy acid residue and further characterized by the presence of at least one residue from a higher aliphatic body selected from the group consisting of hydroxylated fatty bodies, hydroxylated fatty amino bodies and non-nitrogenous polyhydric alcohols.

16. A water-wettable, interfacial and surface-active modified alkyd resin condensation product characterized by the presence of at least one sulfo-phthalyl residue in each molecule and further characterized by the presence of at least one residue from a modifying body consisting of a detergent-forming compound.

TRUMAN B. WAYNE.